United States Patent
Van Rens et al.

(10) Patent No.: US 10,358,566 B2
(45) Date of Patent: Jul. 23, 2019

(54) INK COMPOSITION (71) Applicant: OCE-TECHNOLOGIES B.V., Venlo (NL)

(72) Inventors: Susanne G. W Van Rens, Venlo (NL); Johan P. J. Lenders, Venlo (NL); Christian Smit, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/355,338

(22) Filed: Nov. 18, 2016

(65) Prior Publication Data
US 2017/0066937 A1 Mar. 9, 2017

Related U.S. Application Data (63) Continuation of application No. PCT/EP2015/061045, filed on May 20, 2015.

(30) Foreign Application Priority Data

May 21, 2014 (EP) .................................... 14169352

(51) Int. Cl.
B41J 2/01 (2006.01)
C09D 11/107 (2014.01)
(Continued)

(52) U.S. Cl.
CPC .............. C09D 11/107 (2013.01); B41J 2/01 (2013.01); C09D 11/10 (2013.01); C09D 11/322 (2013.01);
(Continued)

(58) Field of Classification Search
None
See application file for complete search history.

(56) References Cited

U.S. PATENT DOCUMENTS

| 5,902,853 A | 5/1999 | Paine et al. |
| 2010/0203247 A1 | 8/2010 | Kariya et al. |
| 2011/0234690 A1 | 9/2011 | Ooishi et al. |

FOREIGN PATENT DOCUMENTS

| EP | 0997506 A1 | 5/2000 |
| EP | 1577342 A1 | 9/2005 |

(Continued)

OTHER PUBLICATIONS

International Search Report, issued in PCT/EP2015/061045, PCT/ISA/210, dated Jun. 17, 2015.
(Continued)

*Primary Examiner* — Eric S Lin
(74) *Attorney, Agent, or Firm* — Birch, Stewart, Kolasch & Birch, LLP

(57) ABSTRACT

The present invention relates to an ink composition suitable for being ejected from an inkjet marking device at an operating temperature. The ink composition comprises stable dispersed colorant particles and stable dispersed latex resin particles, wherein the ion sensitivity of the colorant particles is larger than the ion sensitivity of the latex resin particles, the ion sensitivity of the colorant particles ($IS_c$) being expressed according to equation 1, and the ion sensitivity of the latex resin particles ($IS_l$) being expressed according to equation 2:

$$IS_c = Z_{cav}(x_c \text{MNaCl})/Z_{cav}(H_2O) \qquad \text{equation 1}$$

$$IS_l = Z_{lav}(x_l \text{MNaCl})/Z_{lav}(H_2O) \qquad \text{equation 2}$$

The invention further relates to an ink set comprising such an ink composition and a primer composition comprising a precipitating agent, preferably a multivalent metal salt. The invention also relates to a method of printing using such an ink set. The inks and ink sets according to the present
(Continued)

invention are capable of improving the transport robustness of prints, in particular of prints on machine coated media.

17 Claims, 1 Drawing Sheet

(51) Int. Cl.
 *C09D 11/10* (2014.01)
 *C09D 11/322* (2014.01)
 *C09D 11/38* (2014.01)
 *C09D 11/40* (2014.01)
 *C09D 11/54* (2014.01)
(52) U.S. Cl.
 CPC .............. *C09D 11/38* (2013.01); *C09D 11/40* (2013.01); *C09D 11/54* (2013.01)

(56) References Cited

FOREIGN PATENT DOCUMENTS

| WO | WO 2013/122601 A1 | 8/2013 |
| WO | WO 2013/131924 A1 | 9/2013 |
| WO | WO 2014/042651 A1 | 3/2014 |
| WO | WO 2014/042652 A1 | 3/2014 |
| WO | WO 2014/042653 A1 | 3/2014 |
| WO | WO 2014/193387 A1 | 3/2014 |
| WO | WO 2014/193387 A1 | 12/2014 |

OTHER PUBLICATIONS

Search Report issued in European priority application 14169352, dated Oct. 28, 2014.
Written Opinion of the International Searching Authority, issued in PCT/EP2015/061045, PCT/ISA/237, dated Jun. 17, 2015.

INK COMPOSITION

CROSS-REFERENCE TO RELATED APPLICATIONS

This application is a Continuation of PCT/EP2015/061045, filed May 20, 2015 and claims priority under 35 U.S.C. § 119(a) to application Ser. No. 14/169,352.3, filed in Europe on May 21, 2014. The entire contents of these applications are herein explicitly incorporated by reference.

FIELD OF THE INVENTION

The present invention relates to a latex ink composition, suitable for use in an inkjet printing process.

BACKGROUND ART

Ink-jet imaging processes with an aqueous latex ink composition on offset media by using a media pre-treatment liquid in order to enhance image quality is known from the prior art.

Published US patent application No. 2011/0234690 discloses an aqueous pigmented ink composition, a treatment liquid comprising an aggregating agent that is capable of fixating the ink composition on the recording medium, which may be an offset recording medium, and a printing process comprising a treatment liquid application step and a printing step, which may be performed before or after the treatment liquid application step. The ink composition may comprise resin particles having a function of aggregating themselves of making the dispersing state thereof unstable and increasing ink viscosity so as to fix an ink composition, that is, an image, when the resin particles contact the aforementioned treatment liquid or a region onto which the treatment liquid has been applied and dried.

Published international patent application WO2013/122601 discloses an ink set comprising an ink, a treatment fluid and a fixer fluid. The ink composition may comprise latex particles, provided there are no metal salts present in the liquid vehicle of the ink composition. The fixer fluid can include a precipitating agent, for example a metal salt of a polyvalent metal cation.

Published European Patent application EP1577342 discloses an ink-jet ink configured to be printed on offset media. The ink composition comprises a pigment and a liquid vehicle that may comprise latex particulates. A fixer fluid comprising a crashing agent that can facilitate the desolubilization or precipitation of one or more component(s) of the ink-jet ink. The crashing agent may be a multivalent ion or ionic group, A disadvantage of the known latex ink compositions that are used in combination with the known treatment liquids to print on offset media (also termed machine coated (MC) media) is that prints created in this way have poor (transport) robustness (e.g. a low rubbing resistance, a low smudge resistance, a low smear resistance). In the context of the present invention, the word robustness will be used, which includes, but is not limited to, the above disclosed wordings.

It is therefore an object of the present invention to provide an ink composition, an ink set and a printing process wherein the (transport) robustness of the printed images is improved in particular on offset media, while maintaining the print quality.

SUMMARY OF THE INVENTION

This object is at least partly achieved by providing an ink composition suitable for being ejected from an inkjet marking device at an operating temperature, the ink composition comprising charge stabilized colorant particles and an ion insensitive latex dispersion.

Therefore in a first aspect, the present invention relates to an ink composition comprising stably dispersed colorant particles and stably dispersed latex resin particles, wherein the ion sensitivity of the colorant particles is larger than the ion sensitivity of the latex resin particles, the ion sensitivities of the colorant particles and the latex resin particles being expressed as ionic strengths, $x_c$ and $x_l$, respectively, at which the ion sensitivity ratio of the colorant particles ($IS_c$) being expressed according to equation 1 is 2, and the ion sensitivity ratio of the latex resin particles ($IS_l$) being expressed according to equation 2 is 2, respectively:

$$IS_c = Z_{cav}(x_c \text{M NaCl})/Z_{cav}(H_2O) \qquad \text{equation 1}$$

$$IS_l = Z_{lav}(x_l \text{M NaCl})/Z_{lav}(H_2O) \qquad \text{equation 2}$$

wherein:

$Z_{cav}(X_c \text{M NaCl})$ is the Z-average particle size determined 200 minutes after adding a droplet of a dispersion comprising colorant particles to 10 ml of a NaCl solution, wherein $x_c$ is the ionic strength (in mol/l) of the NaCl solution to which the droplet of colorant particle dispersion is added and is in a range of 0-6 mol/l;

$Z_{cav}(H_2O)$ is the Z-average particle size determined 200 minutes after adding a droplet of a dispersion comprising colorant particles to 10 ml of demineralised water, $Z_{lav}(x_l \text{M NaCl})$ is the Z-average particle size determined 200 minutes after adding a droplet of a dispersion comprising latex resin particles to 10 ml of a NaCl solution, wherein xi is the ionic strength (in mol/l) of the NaCl solution to which the droplet of latex resin particle dispersion is added and is in a range of 0-6 mol/l;

$Z_{lav}(H_2O)$ is the Z-average particle size determined 200 minutes after adding a droplet of a dispersion comprising latex resin particles to 10 ml of demineralised water.

Without wanting to be bound to any theory it is believed that known pigmented latex ink compositions comprise stable dispersed pigment particles and stable dispersed latex particles and that both particle types are at least partly charge stabilized. When the ionic strength of the ink composition increases, for example when the ink composition comes into contact with a (polyvalent) metal salt present on/in the print substrate and which may originate from a reaction liquid, both the pigment particles and the latex particles destabilize and coagulate.

Due to destabilization of the dispersed latex particles, the absorption of the latex in the print substrate, in particular in low-porous substrates such as offset media, may be disturbed and the latex stays on the surface together with the pigment. Furthermore, due to the destabilization of the dispersed latex particles, the latex cannot form a proper film. Both effects may lead to a deteriorated (transport) robustness of the printed image.

The dispersed latex particles in ink compositions in accordance with one aspect of the present invention are less ion insensitive than the colorant particles and will therefore not destabilize at a (much) higher ionic strength than at which the destabilization of the dispersed colorant particles occurs.

Therefore, upon increasing the ionic strength of the ink composition, the dispersed colorant particles will destabilize first and be pinned to the medium surface, thus obtaining a high image quality (less or no inter color bleed and high optical density), while the latex particles are allowed to form a film that improves the (transport) robustness of the printed image.

In the context of the present invention, ionic strength is defined in accordance with equation 3:

$$I = \frac{1}{2} \times \sum_{i=1}^{n} (c_i \times z_i^2) \qquad \text{equation 3}$$

wherein:
I is the ionic strength in M (i.e. mol/l);
$c_i$ is the concentration of ion i;
$z_i$ is the valence of ion i;
For example, the ionic strength of a 0.5 mol/l $Na_2SO_4$ solution is:

$$0.5*(2*0.5*(1)^2+1*0.5*(-2)^2)=1.5 \text{ M}$$

In an embodiment, the ionic strengths at which the ion sensitivity of the colorant particles and the latex resin particles are both equal to 2 may be expressed as $x_c$ and $x_l$, respectively, and wherein $x_c$ and $x_l$ have the same meaning as $x_c$ in equation 1 and $x_l$ in equation 2, and wherein $x_c$ and $x_l$ both lie in a range of 0-6, and wherein $x_l > x_c$.

In an embodiment, $x_l$-$x_c$ is at least 1 M, preferably at least 2 M, more preferably at least 3 M, more preferably at least 4 M and typically at least 5 M.

In an embodiment, the latex resin particles comprise a resin selected from the group consisting of: polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins.

In an embodiment, the ink composition according to the present invention comprises a cosolvent, preferably selected from the group consisting of: polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

In an embodiment, the ink composition according to the present invention comprises a surfactant, preferably selected from the group consisting of: hydrocarbon surfactants, fluoro surfactants and silicon surfactants.

In an embodiment, the ink composition according to the present invention comprises additives, for example a dispersion stabilizing cosolvent, a penetrant, a viscosity modifier, a pH modifier.

In a second aspect, the present invention relates to an ink set comprising an ink composition as described and a reaction liquid comprising a precipitating agent, the precipitating agent being capable of selectively destabilizing the colorant particles.

Preferably the precipitating agent is a salt, preferably a metal salt, more preferably a polyvalent metal salt.

In an embodiment, the polyvalent metal salt comprises a metal ion selected from the group consisting of: $Ca^{2+}$, $Cu^{2+}$, $Ni^{2+}$, $Mg^{2+}$, $Zn^{2+}$, $Ba^{2+}$, $Al^{3+}$, $Fe^{3+}$, $Cr^{3+}$, $Y^{3+}$ and $Zr^{4+}$. Of the plural, $Ca^{2+}$, $Mg^{2+}$ and $Al^{3+}$ are preferred. In an embodiment, the polyvalent metal salt comprises an anion selected from the group consisting of: carbonate, sulfate, nitrate, chloride, borate and phosphate.

Of the plural, calcium nitrate, calcium chloride, magnesium nitrate, magnesium chloride, aluminum nitrate and aluminum chloride are preferred.

In a third aspect, the present invention relates to a method of printing comprising the steps of:
applying a reaction liquid comprising a polyvalent metal salt to a recording substrate as a first liquid layer; and
printing an image with an ink composition according to the present disclosure on the recording substrate as a second liquid layer;
wherein the amount of polyvalent metal salt in the reaction liquid is such that the ionic strength in the total liquid layer comprised of the first liquid layer and the second liquid layer becomes in the range of between $x_c$ and $x_l$.

In an embodiment, the reaction liquid is first applied and subsequently the image is printed.

In an embodiment, the first liquid layer is first dried and wherein the amount of polyvalent metal salt in the reaction liquid is such that the polyvalent metal salt increases the ionic strength of the second liquid layer to a value in the range of between $x_c$ and $x_l$.

Therefore, aspects of the invention pertain to:
1. An ink composition, comprising: stable dispersed colorant particles; and stable dispersed latex resin particles, wherein an ion sensitivity of the colorant particles is larger than an ion sensitivity of the latex resin particles, the ion sensitivities of the colorant particles and the latex resin particles being expressed as ionic strengths, $x_c$ and $x_l$, respectively, at which an ion sensitivity ratio of the colorant particles ($IS_c$) being expressed according to equation 1 is 2, and an ion sensitivity ratio of the latex resin particles ($IS_1$) being expressed according to equation 2 is 2, respectively:

$$IS_c = Z_{cav}(x_c \text{MNaCl})/Z_{cav}(H_2O) \qquad \text{equation 1}$$

$$IS_l = Z_{lav}(x_l \text{MNaCl})/Z_{lav}(H_2O) \qquad \text{equation 2}$$

wherein: $Z_{cav}$ ($x_c$ M NaCl) is the Z-average particle size determined 200 minutes after adding a droplet of a dispersion comprising colorant particles to 10 ml of a NaCl solution, wherein $x_c$ is the ionic strength in mol/l) of the NaCl solution to which the droplet of colorant particle dispersion is added and is in a range of 0-6 mol/l; $Z_{cav}$ ($H_2O$) is the Z-average particle determined 200 minutes after adding a droplet of a dispersion comprising colorant particles to 10 ml of demineralised water, $Z_{lav}$ ($x_1$ M NaCl) is the Z-average, particle size determined 200 minutes after adding a droplet of a dispersion comprising latex resin particles to 10 ml of a NaCl solution, wherein is the ionic strength (in mol/l) of the NaCl solution to which the droplet of latex resin particle dispersion is added and is in a range of 0-6 mol/l; $Z_{lav}$ ($H_2O$) is the Z-average particle size determined 200 minutes after adding a droplet of a dispersion comprising latex resin particles to 10 ml of demineralised water, wherein $x_l$-$x_c$ is at least 4 mol/l.

2. Ink composition according to 1, wherein $x_l$-$x_c$ is at least 1 mol/l, preferably at least 2 mol/l, more preferably at least 3 mol/l, more preferably at least 4 mol/l and typically at least 5 mol/l.

3. The ink composition according to any one of 1-2, wherein the latex resin particles comprise a resin selected from the group consisting of polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, and styrene-butadiene copolymer resins.

4. The ink composition according to any one of 1-3, wherein the ink composition further comprises a cosolvent, preferably selected from the group consisting of polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

5. The ink composition according to any one of 1-4, wherein the ink composition further comprises a surfactant, preferably selected from the group consisting of: hydrocarbon surfactants, fluoro surfactants and silicon surfactants.

6. The ink composition according to any one of 1-5, wherein the ink composition further comprises additives, for example a dispersion stabilizing cosolvent, a penetrant, a viscosity modifier, a pH modifier.

7. An ink set comprising an ink composition according to any one of 1-6 and a reaction liquid comprising a precipitating agent, the precipitating agent being capable of selectively destabilizing the colorant particles.

8. Ink set comprising:
an ink composition comprising stable dispersed colorant particles and stable dispersed latex resin particles, wherein the ion sensitivity of the colorant particles is larger than the ion sensitivity of the latex resin particles,
the ion sensitivities of the colorant particles and the latex resin particles being expressed as ionic strengths, $x_c$ and $x_l$, respectively, at which the ion sensitivity ratio of the colorant particles ($IS_c$) being expressed according to equation 1 is 2, and the ion sensitivity ratio of the latex resin particles ($IS_l$) being expressed according to equation 2 is 2, respectively:

$$IS_c = Z_{cav}(x_c M NaCl)/Z_{cav}(H_2O) \quad \text{equation 1}$$

$$IS_l = Z_{lav}(x_l M NaCl)/Z_{lav}(H_2O) \quad \text{equation 2}$$

wherein: $Z_{cav}$ ($x_c$ M NaCl) is the Z-average particle size determined 200 minutes after adding a droplet of a dispersion comprising colorant particles to 10 ml of a NaCl solution, wherein $x_c$ is the ionic strength (in mol/l) of the NaCl solution to which the droplet of colorant particle dispersion is added and is in a range of 0-6 mol/l; $Z_{cav}$ (H$_2$O) is the Z-average particle size determined 200 minutes after adding a droplet of a dispersion comprising colorant particles to 10 ml of demineralised water, $Z_{lav}$ ($x_l$ M NaCl) is the Z-average particle size determined 200 minutes after adding a droplet of a dispersion comprising latex resin particles to 10 ml of a NaCl solution, wherein is the ionic strength (in mol/l) of the NaCl solution to which the droplet of latex resin particle dispersion is added and is in a range of 0-6 mol/l; $Z_{lav}$ (H$_2$O) is the Z-average particle size determined 200 minutes after adding a droplet of a dispersion comprising latex resin particles to 10 ml of demineralised water, wherein $x_l$-$x_c$ is at least 4 mol/l; and
a reaction liquid comprising a precipitating agent, the precipitating agent being capable of selectively destabilizing the colorant particles.

9. Ink set according to any one of 7-8, wherein the precipitating agent comprises a polyvalent metal salt.

10. The ink set according to claim 9, wherein the polyvalent metal salt comprises a metal ion selected from the group consisting of: $Ca^{2+}$, $Cu^{2+}$, $Ni^{2+}$, $Mg^{2+}$, $Zn^{2+}$, $Ba^{2+}$, $Al^{3+}$, $Fe^{3+}$, $Cr^{3+}$, $Y^{3+}$ and $Zr^{4+}$.

11. The ink set according to any one of 9-10, wherein the polyvalent metal salt comprises an anion selected from the group consisting of carbonate, sulfate, nitrate, chloride, borate and phosphate.

12. Method of printing comprising the steps of:
applying a reaction liquid to a recording substrate as a first liquid layer;
printing an image with an ink composition according to any one of 1-6 on the recording substrate as a second liquid layer;
wherein the amount of polyvalent metal salt in the reaction liquid is such that the ionic strength in the total liquid layer comprised of the first liquid layer and the second liquid layer becomes in the range of between $x_c$ and $x_l$.

13. The method according to 12, wherein the reaction liquid is first applied and subsequently the image is printed.

14. The method according to 13, wherein the first liquid layer is first dried and wherein the amount of polyvalent metal salt in the reaction liquid is such that the polyvalent metal salt increases the ionic strength of the second liquid layer to a value in the range of between $x_c$ and $x_l$.

BRIEF DESCRIPTION OF THE DRAWINGS

The present invention will become more fully understood from the detailed description given herein below and accompanying schematical drawings which are given by way of illustration only and are not limitative of the invention, and wherein.

DETAILED DESCRIPTION

Ink Composition

An ink composition according to one aspect of the present invention comprises a water-dispersed colorant, a water-dispersed resin (latex) having a lower ion sensitivity than the water-dispersed colorant, water and optionally additives such as a cosolvent, a surfactant and other additives. The components of the inks will be described in detail in the next sections.

Water Dispersible Resin (Latex Resin)

As the water-dispersible resin, a water-dispersible resin excellent in film formability (image formability) and having high water repellency, high water fastness, and high weatherability is useful in recording images having high water fastness and high image density (high color developing ability).

Examples of the water-dispersible resin include synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins.

Examples of the natural polymer compounds include celluloses, rosins, and natural rubbers.

Examples of commercially available water-dispersible resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-633, NeoCryl A-1131, NeoCryl A-2091, NeoCryl A-50, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl XK-15, NeoCryl X-151, NeoCryl XK-232, NeoCryl XK-234, NeoCryl XK-237, NeoCryl XK-238-NeoCryl XK-86, NeoCryl XK-90, NeoCryl XK-95 and NeoCryl XK-205. However, the water-dispersible resin emulsion is not limited to these examples.

In the presence of a strong alkali or strong acid, the water-dispersible resin may suffer from premature or uncontrolled destabilization and/or swelling and/or breakage of the molecular chains, such as dispersion breakage and hydrolysis, and thus the pH of the water-dispersible resin is preferably 4 to 12, and particularly, from the view point of miscibility with water-dispersible colorants, it is more preferably 6 to 11, and still more preferably 7 to 9.

The water-dispersible resin preferably has a function to fix the water-dispersible colorant on the surface of paper, to form a coat at normal temperature and to improve fixability of coloring material. Therefore, the minimum film forming temperature (MFT) of the water-dispersible resin is preferably 60° C. or lower, more preferably 45° C. or lower, even more preferably 30° C. or lower. Alternatively, water dispersible resins having a higher MFT, typically up to 100° C. may be used in combination with a plasticizing cosolvent in order to lower the MFT of the latex composition. Further, if the glass transition temperature of the water-dispersible resin is −40° C. or lower, tucks may occur in printed matters because of the increased viscosity of the resin coat. Thus, the water-dispersible resin preferably has a glass transition temperature of −30° C. or higher.

The content of the water-dispersible resin added in the ink of the present invention is preferably from 1-40 weight % based on the total weight of the ink, and it is more preferably from 1.5-30 weight %, and it is still more preferably from 2-25 weight %. Even more preferably, the amount of the water-dispersible resin contained in the inkjet ink, as a solid content, is 2.5 weight % to 15 weight %, and more preferably 4 weight % to 13 weight %, relative to the total ink composition.

In an embodiment, the ink composition according to the present invention comprises two or more water-dispersible resins selected from the above cited synthetic resins, synthetic copolymer resins and natural polymer compounds in admixture with each other.

Suitability of a resin dispersion in the context of the present invention is determined by adding a droplet of a latex dispersion comprising 10 wt % of resin in water to 10 ml of a series of salt solutions having ionic strengths in the range of 0-10 M and determine the changes in particle size distribution of the latex particles. Suitable latex dispersions show a change in particle size distribution of less than a factor 10 at ionic strengths of 4M or larger, see FIG. 2.

Water-Dispersible Colorant

A water-dispersed colorant may be a pigment or a mixture of pigments, a dye or a mixture of dyes or a mixture comprising pigments and dyes, as long as the colorant is water-dispersible.

In the inkjet ink according to the present invention, a pigment is primarily used as a water-dispersible colorant in view of the weatherability, and, for the purpose of controlling color tone, a dye may be contained within the range not impairing the weatherability. The pigment is not particularly limited and may be suitably selected in accordance with the intended use.

Examples of the pigment usable in the present invention include those commonly known without any limitation, and either a water-dispersible pigment or an oil-dispersible pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used. Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101(colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

The amount of the water-insoluble pigment contained in the inkjet ink, as a solid content, is preferably 0.5 weight % to 15 weight %, more preferably 0.8 weight % to 10 weight %, and even more preferably between 1 weight % and 6 weight %. When the amount of the water-insoluble pigment is less than 0.5 weight %, the color developing ability and image density of the ink may degrade. When it is more than 15 weight %, unfavorably, the viscosity of the ink is increased, causing a degradation in ink ejection stability.

Solvent

Water is cited as an environmentally friendly and hence desirable solvent. In the present invention, the content of water to the whole ink is preferably from 20 weight % to 80 weight %. It is more preferable that the content of water is from 30 weight % to 75 weight %, even more preferable from 40 weight % to 70 weight %.

Cosolvent

As a solvent of the ink, for the purposes of improving the ejection property of the ink or adjusting the ink physical properties, the ink preferably contains a water soluble organic solvent in addition to water. As long as the effect of the present invention is not damaged, there is no restriction in particular in the type of the water soluble organic solvent.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of the solvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylol-propane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol monopropyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

Examples of the amides include formamide (bp 210° C.), N-methylformamide (bp 199° C.-201° C.), N,N-dimethylformamide (bp 153° C.), and N,N-diethylformamide (bp 176° C.-177° C.).

Examples of the amines include monoethanolamine (bp 170° C.), dimethanolamine (bp 268° C.), triethanolamine (bp 360° C.), N,N-dimethylmonoethanolamine (bp 139° C.), N-methyldiethanolamine (bp 243° C.), N-methylethanolamine (bp 159° C.), N-phenylethanolamine (bp 282° C.-287° C.), 3-aminopropyl diethylamine (bp 169° C.), N-ethyldiethanolamine, N,N-diethylmonoethanolamine, tripropanolamine, 2-amino-2-methyl-1-propanol, N-ethylmonoethanolamine, N,N-di-n-butylmonoethanolamine, diisopropanolamine, N-n-butylmonoethanolamine, N-n-butyldiethanolamine and diglycolamine.

Examples of the sulfur-containing compounds include dimethylsulfoxide (bp 139° C.), sulfolane (bp 285° C.), and thiodiglycol (bp 282° C.).

As other solid water-soluble organic solvents, saccharides are preferable. Examples of the saccharides include monosaccharides, disaccharides, oligosaccharides (including triaccharides and tetrasaccharide), and polysaccharides.

Specific examples thereof include glucose, mannose, fructose, ribose, xylose, arabinose, galactose, maltose, cellobiose, lactose, sucrose, trehalose, and maltotriose. Here, the above-mentioned polysaccharides mean broad sense-saccharides, which may include substances existing widely in nature, such as orcyclodextrin and cellulose. Derivatives of these saccharides include reducing sugars of saccharides (for example, sugar alcohol, which is expressed by the general formula: $HOCH_2(CHOH)_nCH_2OH$, wherein n is an integer of 2 to 5), oxidized sugars (for example, aldonic acids and uronic acids), amino acids, and thio acids. Among these, sugar alcohol is preferable. Specific examples of sugar alcohol include maltitol and sorbitol.

In an embodiment, a mixture of the water-soluble organic solvents may be comprised in an ink composition according to the present invention. The individual organic solvents preferably being present in an amount of 1 weight % to 50 weight %, more preferably in an amount of 1 weight % to 40 weight %, even more preferably in an amount of 1 weight % to 25 weight %, relative to the total ink composition.

The total amount of the water-soluble organic solvent contained in the ink composition is not particularly limited. It is, however, preferably 0 weight % to 75 weight %, and more preferably 10 weight % to 70 weight %, and even more preferably 15 weight % to 60 weight % with respect to the total ink composition. When the amount of the water-soluble organic solvent is more than 80 weight %, the drying times of the ink compositions are too long. When the amount is less than 10 weight %, water in the ink compositions may evaporate more quickly, which may significantly reduce the stability of the ink composition.

In an embodiment, an amino alcohol, in particular a N-alkyl-dialkanolamine, is used as a cosolvent in a small amount, i.e. less than 3 weight %, preferably less than 2 weight %, more preferably around 0.5 weight % with respect to the total ink composition. In such an ink formulation, the total fraction of stabilizing cosolvents can be significantly reduced (e.g. from 40 weight % to between 20 weight % and 30 weight %) without compromising the ink stability (in the inkjet head) and spreading properties on a receiving medium. An ink composition according to the present embodiment preferably comprises a total amount of cosolvents of between 0 weight % and 40 weight %, preferably between 10 weight % and 35 weight %, more preferably between 20 weight % and 30 weight %. Examples of suitable amino alcohols are: triethanolamine, N-metyldiethanolamine, N-ethyldiethanolamine, N-n-butyl-monoethanolamine and N-n-butyl-diethanolamine.

Surfactants

It is preferable that the ink of the present invention contains a surfactant in order to improve an ink ejection property and/or the wettability of the surface of a recording medium, and the image density and color saturation of the image formed and reducing white spots therein. To improve the spreading of the ink on the surface of recording medium and to reduce puddling, it is preferable to adjust the dynamic surface tension (measured at 10 Hz) of the ink composition to 35 mN/m or lower, preferably to 34 nN/m or lower, more preferably to 33 mN/m or lower, even more preferably to 32 mN/m or lower by the surfactant. The static surface tension of the ink composition is preferably below 30 mN/m (measured at 0.1 Hz).

Examples of surfactants are not specifically limited. The following can be cited.

Examples of the surfactant include nonionic surfactants, cationic surfactants, anionic surfactants, amphoteric surfactants, in particular betaine surfactants, silicone surfactants, and fluorochemical surfactants. Particularly, at least one selected from acetylene surfactants, silicone surfactants and fluorochemical surfactants capable of reducing the surface tension to 30 mN/m or lower is preferably used.

Examples of a cationic surfactant include: aliphatic amine salts, aliphatic quarternary ammonium salts, benzalkonium salts, benzethonium chloride, pyridinium salts, imidazolinium salts.

Examples of an anionic surfactant include: polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutamate, an acylated peptide, an alkylsulfonic acid salt, an alkylbezenesulfonic acid salt, an alkylnaphthalenesulfonic acid salt, a dialkylsulfo succinate (e.g. sodium dioctyl sulfosuccinate (DSS); alternative names: docusate sodium, Aerosol OT and AOT), alkylsulfo acetate, α-olefin sulfonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido sulfate salt, an alkyl ether phosphate salt and an alkyl phosphate salt. Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an acetyleneglycol, an ethoxylated acetylene glycol, acetylene alcohol.

Specific examples of ethoxylated acetylene glycols are ethoxylated 3-methyl-1-nonyn-3-ol, ethoxylated 7,10-dimethyl-8-hexadecyne-7,10-diol, ethoxylated 4,7-dimethyl-5-decyne-4,7-diol, ethoxylated 2,4,7,9-tetramethyl-5-decyne-4,7-diol, and ethoxylated 2,5,8,11-tetramethyl-6-dodecyne-5,8-diol. These can be used in combination with each other.

It is preferable that a part of these surfactants is furthermore substituted with a fluorine atom or a silicon atom from a viewpoint of reducing the surface tension.

As the fluorochemical surfactant, a surfactant having 2 to 16 fluorine-substituted carbon atoms is preferred, and a surfactant having 4 to 16 fluorine-substituted carbon atoms is more preferred. When the number of fluorine-substituted carbon atoms is less than 2, the effect peculiar to a fluorochemical surfactant may not be obtained. When it is more than 16, degradation in storage stability etc. may arise.

Examples of the fluorochemical surfactants include nonionic fluorochemical surfactants, anionic fluorochemical surfactants, and amphoteric fluorochemical surfactants.

Examples of the nonionic fluorochemical surfactants include perfluoroalkyl phosphoric acid ester compounds, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property.

As the fluorochemical surfactants, commercially available products may be used. Examples of the commercially available products include SURFLON S-HI, S-112, S-113. S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink Chemical Industries Co., Ltd.), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-136A, PF-156A, PF-151N, PF-154, and PF-159 (all of which are produced by OMNOVA Solutions Inc.). Among these, ZONYL FS-300 (produced by E. I. du Pont de Nemours and Company), FT-110, FT-250, FT-251, FT-400S, FT-150, FT-400SW (produced by Neos Company Limited), and POLYFOX PF-151N (produced by OMNOVA Solutions Inc.) are preferable in that they are excellent in print quality, particularly in color developing ability and in dye-leveling property.

The silicone surfactant is not particularly limited and may be suitably selected in accordance with the intended use.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants.

The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

The polyether-modified silicone surfactant is not particularly limited and may be suitably selected in accordance with the intended use.

As the polyether-modified silicone surfactant, commercial products may be used. Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348, BYK 349, BYK 3455, BYK-387 (produced by BYK Chemie GmbH); Tegowet 240, Tegowet 245, Tegowet 250, Tegowet 260 (produced by Evonik); Silwet L-77 (produced by Sabic).

All surfactants mentioned in this section may be used solely, or they may be used in combination of the plural.

The total amount of the surfactant contained in the inkjet ink is preferably 0.01 weight % to 3.0 weight %, and more preferably 0.5 weight % to 2 weight %, with respect to the total ink composition. When the amount of the surfactant is less than 0.01 weight %, the effect of adding the surfactant may be substantially reduced or even insignificant. When it is more than 3.0 weight %, the permeability to recording media may be higher than necessary, possibly causing a degradation of image density and occurrence of ink-strikethrough.

Penetrant

The ink composition according to the present invention may optionally further contain a penetrant, which is a compound that promotes absorption of the ink composition in the print medium. Penetrants as used in the present invention preferably comprise at least one of non-wettable polyol compounds having 8 to 11 carbon atoms or glycol ether compounds for the purpose of satisfying the permeability and the solubility in water. Here, the term "non-wettable" means having a solubility in the range of 0.2% by mass to 5.0% by mass in water at 25° C. Note that compounds used as cosolvents as disclosed above, may also act as penetrant.

Among these penetrants, preferred is a 1,3-diol such as: 2-ethyl-1,3-hexane diol [solubility: 4.2% (25° C.)] and 2,2, 4-trimethyl-1,3-pentane diol [solubility: 2.0% (25° C.)].

Examples of other non-wettable polyol compounds include aliphatic diols such as: 2-ethyl-2-methyl-1,3-propanediol; 3,3-dimethyl-1,2-butanediol; 2,2-diethyl-1,3-propanediol; 2-methyl-2-propyl-1,3-propanediol; 2,4-dimethyl-2,4-pentanediol; 2,5-dimethyl-2,5-hexanediol; and 5-hexen-1,2-diol.

Other penetrants usable alone or in combination with those described above are not particularly limited, as long as they can be dissolved in the ink composition and designed to have desired physical properties, and may be suitably selected in accordance with the intended use. Examples thereof include alkyl and aryl ethers of polyhydric alcohols (e.g., diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether); and lower alcohols (e.g., ethanol).

The amount of the penetrant contained in the inkjet ink is from 0 weight % to 4.0 weight %, preferably from 0.1 weight % to 3.0 weight %, more preferably from 0.5 weight % to 2.0 weight %, relative to the total ink composition.

When the amount of the penetrant is less than 0.1 weight %, quick-dryness may not be obtained, possibly causing image bleeding (coalescence). When it is more than 4.0 weight %, the dispersion stability of colorants and water-dispersible resins may be impaired, easily causing nozzle clogging, and the permeability to recording media may be higher than necessary, possibly causing a degradation of image density and occurrence of ink-strikethrough.

Pre-treatment Liquid

To improve the print quality of an inkjet process using an ink according to the present invention, and in particular on machine coated or offset coated media, a pre-treatment step may be applied prior to inkjet printing.

A pre-treatment liquid used in such a pre-treatment step may increase the surface tension of the receiving medium and enhance spreading of the ink on the receiving medium. The pre-treatment liquid may also be capable of aggregating the inkjet ink ingredients or thickening (increasing the viscosity of) the inkjet ink by decreasing the solubility of solid components dissolved in the ink. In relation to the latter aspect, the pre-treatment liquid preferably contains at least one of a polyvalent metal salt, an acid and a cationic resin. By contacting the pre-treatment liquid containing a polyvalent metal salt with an ink, the cation contained in the pre-treatment liquid will interact with the pigment, an anion in the (dispersed) resin or other ingredients present in the ink to result in aggregation sedimentation of the ingredients of the ink. This can prevent bleeding or mottling of the ink.

The main solvent contained in the pre-treatment liquid is preferably water (an aqueous pre-treatment liquid), and a water-soluble organic solvent or a surfactant may be contained when needed.

As a polyvalent metal salt which can be applied in a pre-treatment liquid, a salt of a metal with a valence of 2 or more can be used. Examples of a preferable cation include: a divalent metal ion such as $Ca^{2+}$, $Cu^{2+}$, $Ni^{2+}$, $Mg^{2+}$, $Zn^{2+}$ and $Ba^{2+}$; a trivalent metal ion such as $Al^{3+}$, $Fe^{3+}$, $Cr^{3+}$ and $Y^{3+}$; and a tetravalent metal ion such as $Zr^{4+}$. Of the plural, $Ca^{2+}$, $Mg^{2+}$ and $Al^{3+}$ are preferred.

As a type of salt, well-known salts can be used. Examples are salts of: carbonic acid, sulfuric acid, nitric acid, hydrochloric acid, an organic acid, boric acid and phosphoric acid. It is also preferable to adjust a pH value if needed for dissolving the polyvalent metal salt. Of the plural, calcium nitrate, calcium chloride, aluminum nitrate and aluminum chloride are preferred.

As a kind of an acid which can be applied to a pre-treatment liquid, there is no specific limitation. It is preferable to use an acid having of a pKa value smaller than 4.5. Although there is no restriction in particular as a kind of a cationic resin having a positive charge and applicable to a pre-treatment liquid, a resin having a quaternary amine is preferable from the ability to acquire a high effect by a small amount of addition in the pre-treatment liquid.

It is preferable to incorporate in the pre-treatment liquid additives such as a surfactant or a cosolvent which adjust the liquid properties other than the above-mentioned compound which aggregates the solid ingredients of the ink or increasing a viscosity of the ink.

For example, similar cosolvents and surfactants as shown for the ink of the present invention can be also used for the pre-treatment liquid.

Further, the pre-treatment liquid may contain a variety of additives for the various purposes. Examples of such additives include: polysaccharides, a viscosity modifier, a specific resistance controlling agent, a film forming agent, an UV absorbing agent, an antioxidant, an anti-discoloring agent, an antiseptic agent, or an anti-rusting agent.

Specific examples thereof include: minute oil droplets of liquid paraffin, dioctyl phthalate, tricresyl phosphate, or silicone oil; UV absorbing agents; anti-discoloring agents; and optical brightening agents.

A preferable amount of the pre-treatment liquid applied to a receiving medium, in particular to a machine coated or offset coated medium is from 0.05 ml/m² to 20 ml/m², preferably from 0.1 ml/m² to 10 ml/m² and more preferably it is from 0.5 to 5 ml/m².

Receiving Media

Suitable receiving media for use in a printing process using an ink or set of inks (Cyan, Magenta, Yellow and blacK, CMYK) according to the present invention are not particularly limited to any type. The receiving medium may be suitably selected depending on the intended application.

Suitable receiving media may range from strongly water absorbing media such as plain paper (for example Océ Red Label) to non-water-absorbing media such as plastic sheets (for example PE, PP, PVC and PET films). To optimize print quality, inkjet coated media are known, which media comprise a highly water absorbing coating.

Of particular interest in the context of the present invention are Machine Coated (MC) media (also known as offset coated media) and glossy (coated) media. MC media are designed for use in conventional printing processes, for example offset printing and show good absorption characteristics with respect to solvents used in inks used in such printing processes, which are usually organic solvents. MC and glossy media show inferior absorption behavior with respect to water (worse than plain paper, better than plastic sheets), and hence aqueous inks.

Machine coated or offset coated media comprise a base layer and a coating layer.

The base layer may be a sheet of paper mainly made of wood fibers or a non-woven fabric material comprising wood fibers combined with synthetic fibers. The base layer may be made of wood pulp or recycled paper pulp and may be bleached.

As an internal filler for the base, a conventional white pigment may be used. For example, the following substances may be used as a white pigment: an inorganic pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin. These may be used alone or in combination.

As an internal sizing agent used when producing the base, a neutral rosin size used for neutral papermaking, alkenyl succinic anhydride (ASA), alkyl ketene dimer (AKD), or a petroleum resin size may be used. Especially, a neutral rosin size and alkenyl succinic anhydride are preferable. Alkyl ketene dimer has a high sizing effect and therefore provides an enough sizing effect with a small amount. However, since alkyl ketene dimer reduces the friction coefficient of the surface of recording paper (medium), recording paper made using alkyl ketene dimer may cause a slip when being conveyed in an ink jet recording apparatus.

The thickness of the base is not particularly limited and may be suitably selected in accordance with the intended use. It is, however, preferably 50 μm to 300 μm. The basis weight of the base is preferably 45 g/m² to 290 g/m².

The coating layer may comprise a (white) pigment, a binder and may further contain a surfactant and other components as required.

An inorganic pigment or a combination of an inorganic pigment and an organic pigment can be used as the pigment.

Examples of the inorganic pigment include kaolin, talc, calcium bicarbonate, light calcium carbonate, calcium sulfite, amorphous silica, titanium white, magnesium carbonate, titanium dioxide, aluminum hydroxide, calcium hydroxide, magnesium hydroxide, zinc hydroxide and chlorite. Among these, kaolin is particularly preferable due to its superior glossability. The addition amount of the kaolin is preferably 50 parts by mass or more with respect to 100 parts of the binder in the coating layer. When the amount of kaolin is less than 50 parts by mass, adequate effects are unable to be obtained with respect to glossiness.

Examples of the organic pigment include (aqueous) dispersions of, for example, styrene-acrylic copolymer particles, styrene-butadiene copolymer particles, polystyrene particles or polyethylene particles. These organic pigments may be used in combination.

The addition amount of the organic pigment is preferably 2 parts by mass to 20 parts by mass with respect to 100 parts by mass of the total amount of the pigment in the coating layer. Since the organic pigment has superior glossability and the specific gravity thereof is small in comparison with inorganic pigment, it allows the obtaining of a coating layer having high bulk, high gloss and satisfactory surface coatability.

An aqueous resin is preferably used for the binder. At least one of a water-soluble resin and a water-dispersible resin is preferably used for the aqueous resin. There are no particular limitations on the water-soluble resin, the water-soluble resin can be suitably selected according to the intended use. Examples thereof include polyvinyl alcohol and polyvinyl alcohol modification products such as anion-modified polyvinyl alcohol, cation-modified polyvinyl alcohol or acetal-modified polyvinyl alcohol; polyurethane; polyvinyl pyrrolidone and polyvinyl pyrrolidone modification products such as copolymers of polyvinyl pyrrolidone and vinyl acetate, copolymers of vinyl pyrrolidone and dimethylaminoethyl methacrylate, copolymers of quaternized vinyl pyrrolidone and dimethylaminoethyl methacrylate or copolymers of vinyl pyrrolidone and methacrylamide propyl trimethyl ammonium chloride; celluloses such as carboxymethyl cellulose, hydroxyethyl cellulose or hydroxypropyl cellulose; cellulose modification products such as cationized hydroxyethyl cellulose; synthetic resins such as polyester, polyacrylic acid (ester), melamine resin or modification products thereof or copolymers of polyester and polyurethane; and poly(meth)acrylic acid, poly(meth)acrylamide, oxidized starch, phosphoric acid-esterified starch, self-modifying starch, cationized starch, various types of modified starch, polyethylene oxide, sodium polyacrylate and sodium arginate. These water-soluble resins may be used alone or in combination.

There are no particular limitations on the water-dispersible resin, a water-dispersible resin can be suitably selected in accordance with the intended use, and examples thereof include polyvinyl acetate, ethylene-vinyl acetate copolymers, polystyrene, styrene-(meth)acrylic acid ester copolymers, (meth)acrylic acid ester copolymers, vinyl acetate-(meth)acrylic acid (ester) copolymers, styrene-butadiene copolymers, ethylene-propylene copolymers, polyvinyl ether and silicone-acrylic copolymers. In addition, a cross-linking agent such as methylolated melamine, methylolated urea, methylolated hydroxypropylene urea or isocyanate may also be contained, and the water-dispersible resin may self-crosslink with a copolymer containing a unit such as N-methylolacrylamide. A plurality of these aqueous resins can also be used simultaneously.

The addition amount of the aqueous resin is preferably 2 parts by mass to 100 parts by mass and more preferably 3 parts by mass to 50 parts by mass with respect to 100 parts by mass of the pigment. The amount of the aqueous resin is determined so that the liquid absorption properties of the recording media are within a desired range.

Printing Process

Figure 1:
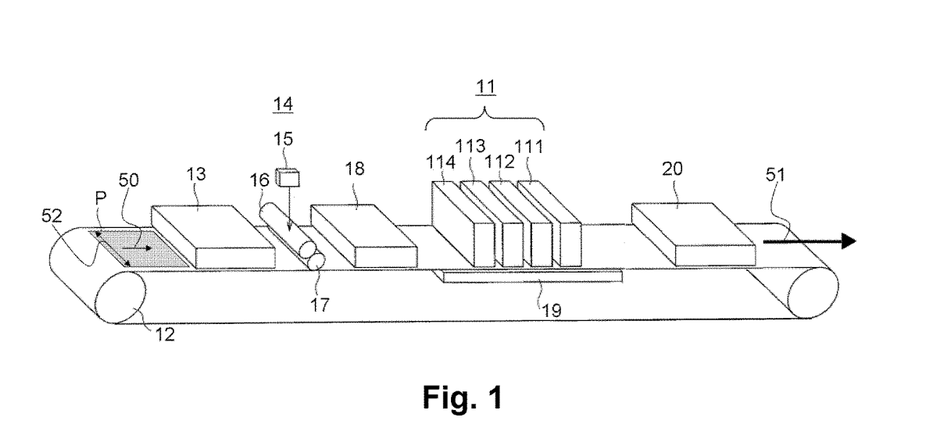
FIG. 1 shows a schematic representation of an inkjet printing system.

A printing process in which the inks according to the present invention may be suitably used is described with reference to the appended drawings shown in FIG. 1. FIG. 1 shows that a sheet of a receiving medium, in particular a machine coated or offset coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these vacuum fixation is preferred.

The printing process as described below comprises of the following steps: media pre-treatment, image formation, drying, fixation and optionally post treatment.

Media Pre-treatment

To improve the spreading and pinning (i.e. fixation of pigments and water-dispersed polymer particles) of the ink on the receiving medium, in particular on slow absorbing media, such as machine coated or offset coated media, the receiving medium may be pretreated, i.e. treated prior to printing an image on the medium. The pre-treatment step may comprise one or more of the following:

preheating of the receiving medium to enhance spreading of the used ink on the receiving medium and/or to enhance absorption of the used ink into the receiving medium;

primer pre-treatment for increasing the surface tension of receiving medium in order to improve the wettability of the receiving medium by the used ink and to control the stability of the dispersed solid fraction of the ink composition (i.e. pigments and dispersed polymer particles). Primer pre-treatment may be performed in the gas phase, e.g. with gaseous acids such as hydrochloric acid, sulfuric acid, acetic acid, phosphoric acid and lactic acid, or in the liquid phase by coating the receiving medium with a pre-treatment liquid. The pre-treatment liquid may comprise water as a solvent, one or more cosolvents, additives such as surfactants and at least one compound selected from a polyvalent metal salt, an acid and a cationic resin (discussed in detail above);

corona or plasma treatment.

Primer Pre-treatment

As an application way of the pre-treatment liquid, any conventionally known methods can be used. Specific examples of an application way include: a roller coating, an ink-jet application, a curtain coating and a spray coating. There is no specific restriction in the number of times with which the pre-treatment liquid is applied. It may be applied at one time, or it may be applied in two times or more. Application in two times or more may be preferable, since cockling of the coated printing paper can be prevented and the film formed by the surface pre-treatment liquid will produce a uniform dry surface having no wrinkle by applying in 2 steps or more.

Especially a roller coating (see 14 in FIG. 1) method is preferable because this coating method does not need to take into consideration of ejection properties and it can apply the aqueous pre-treatment liquid homogeneously to a recording medium. In addition, the amount of the applied pre-treatment liquid with a roller or with other means to a recording medium can be suitably adjusted by controlling: the physical properties of the pre-treatment liquid; and the contact pressure of a roller in a roller coater to the recording medium and the rotational speed of a roller in a roller coater which is used for a coater of the pre-treatment liquid. As an application area of the pre-treatment liquid, it may be possible to apply only to the printed portion, or to the entire surface of both the printed portion and the non-printed portion. However, when the pre-treatment liquid is applied only to the printed portion, unevenness may occur between the application area and a non-application area caused by swelling of cellulose contained in the coated printing paper with the water in the pre-treatment liquid followed by drying. Then, from the viewpoint of drying uniformly, it is preferable to apply a pre-treatment liquid to the entire surface of a coated printing paper, and roller coating can be preferably used as a coating method to the whole surface.

Corona or Plasma Treatment

Corona or plasma treatment may be used as a pre-treatment step by exposing a sheet of a receiving medium to corona discharge or plasma treatment. In particular when used on media like polyethylene (PE) films, polypropylene (PP) films, polyethylene terephthalate (PET) films and machine coated or offset coated media, the adhesion and spreading of the ink can be improved by increasing the surface energy of the media. With machine coated or offset coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbon dioxide, methane, fluorine gas, argon, neon and mixtures thereof. Corona treatment in air is most preferred.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Optionally and subsequently, a predetermined quantity of the aqueous pre-treatment liquid is applied on the surface of the receiving medium P at aqueous pre-treatment liquid applying member 14. Specifically, the aqueous pre-treatment liquid is provided from storage tank 15 of the aqueous pre-treatment liquid to the aqueous pre-treatment liquid applying member 14 composed of double rolls 16 and 17. Each surface of the double rolls may be covered with a porous resin material such as sponge. After providing the aqueous pre-treatment liquid to auxiliary roll 16 first, the aqueous pre-treatment liquid is transferred to main roll 17, and a predetermined quantity is applied on the surface of the receiving medium P. Subsequently, the coated printing paper P on which the aqueous pre-treatment liquid was supplied may optionally be heated and dried by drying member 18 which is composed of a drying heater installed at the downstream position of the aqueous pre-treatment liquid applying member 14 in order to decrease the quantity of the water content in the aqueous pre-treatment liquid to a predetermined range. It is preferable to decrease the water content in an amount of 1.0 weight % to 30 weight % based on the total water content in the provided pre-treatment liquid provided on the receiving medium P.

To prevent the transportation mechanism 12 being contaminated with pre-treatment liquid, a cleaning unit (not shown) may be installed and/or the transportation mechanism may be comprised multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and black). The nozzle pitch of each head is e.g. about 360 dpi. In the present invention, "dpi" indicates a dot number per 2.54 cm.

An inkjet marking device for use in single pass inkjet printing, 111, 112, 113, 114, has a length of at least the width of the desired printing range, indicated with double arrow 52, the printing range being perpendicular to the media transport direction, indicated with arrows 50 and 51. The inkjet marking device may comprise a single print head having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of print heads.

In image formation by ejecting an ink, an inkjet head (i.e. print head) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 μm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 30° C. to 60° C. The temperature control device 19 may comprise heaters, such as radiation heaters, and a cooling means, for example a cold blast, in order to control the surface temperature of the receiving medium within said range. Subsequently and while printing, the receiving medium P is conveyed to the downstream part of the inkjet marking module 11.

Drying and Fixation

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixation unit 20, which may comprise a heater, for example a radiation heater. After an image has been formed, the print is conveyed to and passed through the drying and fixation unit 20. The print is heated such that solvents present in the printed image, to a large extent water, evaporate. The speed of evaporation and hence drying may be enhanced by increasing the air refresh rate in the drying and fixation unit 20. Simultaneously, film formation of the ink occurs, because the prints are heated to a temperature above the minimum film formation temperature (MFT). The residence time of the print in the drying and fixation unit 20 and the temperature at which the drying and fixation unit 20 operates are optimized, such that when the print leaves the drying and fixation unit 20 a dry and robust print has been obtained. As described above, the transportation mechanism 12 in the fixation and drying unit 20 may be separated from the transportation mechanism of the pre-treatment and printing section of the printing apparatus and may comprise a belt or a drum.

Hitherto, the printing process was described such that the image formation step was performed in-line with the pre-treatment step (e.g. application of an (aqueous) pre-treatment liquid) and a drying and fixation step, all performed by the same apparatus (see FIG. 1). However, the printing process is not restricted to the above-mentioned embodiment. A method in which two or more machines are connected through a belt conveyor, drum conveyor or a roller, and the step of applying an aqueous pre-treatment liquid, the (optional) step of drying a coating solution, the step of ejecting an inkjet ink to form an image and the step or drying an fixation the printed image are performed. It is, however, preferable to carry out image formation with the above defined in-line image forming method.

EXAMPLES

Materials

All materials used in the examples are used as obtained from the supplier, unless otherwise stated. The suppliers of the used materials are indicated in the specific examples.

The receiving media used in the Examples are the machine coated media TC+ gloss (Top Coated Plus Gloss obtained from Océ), and TC+ silk (Top Coated Plus Silk obtained from Océ).

Primer composition: the primer composition used in the examples of the present application comprised 42 wt % $MgCl_2 \cdot 6H_2O$, 13 wt % propylene glycol, 13 wt % glycerol, 0.2 wt % Triton®-X100 and balance water. All components were obtained from Sigma Aldrich and used as received.

Measurement Techniques

Ion Sensitivity Test

A droplet of a composition comprising 10 wt % (unless otherwise specified) of dispersed particles (i.e. latex resin or colorant/pigment particles) is added to 10 ml. of x M monovalent salt (NaCl), wherein x was varied between 0 and 6. The particle size distribution (PSD) of the obtained dispersion was measured during 200 minutes in accordance with the method below and compared to the particle size distribution (PSD) of the latex or colorant in 10 ml. of water, by determining the ratio of the Z-average particle size after 200 minutes in x M salt solution and the Z-average particle size after 200 minutes in water. The ion sensitivity ratio of the colorant particles may be measured according to equation 1 and the ion sensitivity ratio of the latex resin particles may be measured according to equation 2:

$$IS_c = Z_{cav}(x_c \text{ M NaCl})/Z_{cav}(H_2O) \qquad \text{equation 1}$$

$$IS_l = Z_{cav}(x_l \text{ M NaCl})/Z_{lav}(H_2O) \qquad \text{equation 2}$$

wherein:

$Z_{cav}$ ($x_c$ M NaCl) is the Z-average particle size determined 200 minutes after adding a droplet of a dispersion comprising colorant particles to 10 ml of a NaCl solution, wherein $x_c$ is the ionic strength (in mol/l) of the NaCl solution to which the droplet of colorant particle dispersion is added and is in a range of 0-6 mol/l;

$Z_{cav}$ ($H_2O$) is the Z-average particle size determined 200 minutes after adding a droplet of a dispersion comprising colorant particles to 10 ml of demineralised water, $Z_{lav}$ ($x_l$ M NaCl) is the Z-average particle size determined 200 minutes after adding a droplet of a dispersion comprising latex resin particles to 10 ml of a NaCl solution, wherein $x_l$ is the ionic strength (in mol/l) of the NaCl solution to which the droplet of latex resin particle dispersion is added and is in a range of 0-6 mol/l;

$Z_{lav}$ ($H_2O$) is the Z-average particle size determined 200 minutes after adding a droplet of a dispersion comprising latex resin particles to 10 ml of demineralised water.

Figure 2:
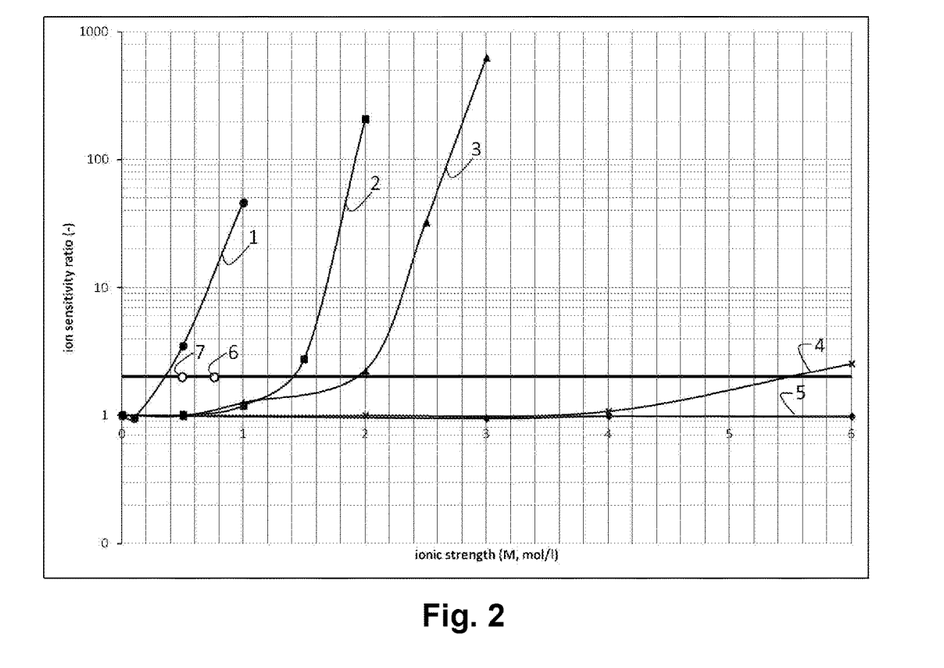
FIG. 2 shows a graphical representation of the salt sensitivity of several latex compositions.

The results of the above described ratios were plotted against ionic strength as a variable (see FIG. 2).

Experiment 1

Determininq the Salt Sensitivity of Several Latex Compositions as Used in the Examples The above described procedure was performed for 4 latices out of the Neocryl® series of DSM: A633, XK237, A662 and A668. The results of these measurements are shown in FIG. 2.

Experiment 2

Determininq the Salt Sensitivity of a Pigment Dispersion as Used in the Examples The above described procedure was performed for a Pro-Jet Cyan APD 1000 pigment dispersion (14 wt % pigment dispersion, obtained from FujiFilm Imaging Colorants). The result of this measurement is shown in FIG. 2.

In FIG. 2 the ion sensitivity of Pro-jet Cyan APD 1000 pigment is represented by curve 1. The ion sensitivities of latex resins Neocryl® A662, Neocryl® XK237, Neocryl® A668 and Neocryl® A633 are represented by curves 2, 3, 4 and 5 respectively. From FIG. 2 it can be concluded that the ion sensitivities of the tested lattices are smaller than the ion sensitivity of the tested pigment dispersion. The ionic strengths of the pigment dispersion and the lattices at which the ion sensitivities (e.g., each ratio) are 2 ($x_c$ and $x_l$, respectively) and $x_l$-$x_c$ are given in Table 1.

Particle Diameter

Particle diameter measurement of the pigment dispersion is carried out with a commercially available particle diameter analyzer, the Malvern Zetasizer Nano series Nano-S) employing a light scattering method.

TABLE 1 results experiments 1 and 2

| Particle type | x ($x_{colorant}$, $x_{latex}$ resp.) | $x_{latex} - x_{colorant}$ |
|---|---|---|
| Pro-Jet Cyan APD 1000 pigment | 0.35 | — |
| Neocryl ® A633 | >>6 | >>5.65 |
| Neocryl ® XK237 | 1.9 | 1.55 |
| Neocryl ® A662 | 1.4 | 1.05 |
| Neocryl ® A668 | 5.4 | 5.05 |

Rod-coat Experiments

A layer of a wet ink-composition is applied with a rod-coater of RK Print Coat Instruments U.K., using rods that provide a coating layer having a thickness of 10 μm and 16 μm, respectively. The rod coated samples were fused at 80° C. at a transportation speed of the rod coated substrates of 625 mm/s.

Robustness Tests

Manual Rub Test

Directly after fusing an ink image to a sheet of recording media, the ink layer is rubbed with a teat for Pasteur pipettes made of PVC (Volac Red Teat, art. Number D813 obtained from Poulten & Graf Ltd). The manual rub test represents forces exerted by paper handling and transport rollers. The robustness of the print is judged based on the damage imparted to the ink layer and valued from 1 to 5, wherein:

5 represents an excellent print robustness: no damage imparted to the ink layer;

4 represents a good print robustness: some matting effect of the rubbed area;

3 represents a sufficient print robustness: minor visual damage imparted to the ink layer;

2 represents a weak print robustness: substantial visual damage imparted to the ink layer;

1 represents a bad print robustness: completely removed ink layer after rubbing.

Nip Test

A strip of printed substrate is put against another strip of unprinted substrate, the printed side facing the other strip. The joint strips are transferred over a heated surface (80° C., unless stated otherwise) and subjected to 1 bar of pressure between two rollers. This test simulates a second fixation step and the contact of the first ink layer with machine parts at elevated temperature. Both the printed strip and the unprinted strip are visually inspected afterwards.

The robustness of the print is judged based on the damage imparted to the ink layer and the transfer of ink to the unprinted substrate. The robustness is valued from 1 to 5, wherein:

5 represents an excellent print robustness: no damage imparted to the ink layer and no transfer of ink to the unprinted substrate;

4 represents a good print robustness: some matting effect of the rubbed area and virtually no transfer of ink to the unprinted substrate;

3 represents a sufficient print robustness: minor visual damage imparted to the ink layer and/or minor visual transfer of ink to the unprinted substrate;

2 represents a weak print robustness: substantial visual damage imparted to the ink layer and/or substantial transfer of ink to the unprinted substrate;

1 represents a bad print robustness: virtually complete transfer of ink to the unprinted substrate.

Experiments 3-7

Preparation of Latex Ink Compositions 225 grams of NeoCryl A662 latex (obtained from DSM, 40 wt % solids), 142.9 grams of Pro-Jet Cyan APD 1000 pigment dispersion (14 wt % pigment dispersion, obtained from FujiFilm Imaging Colorants), 120 grams of glycerin (obtained from Sigma Aldrich), 120 grams of trimethylglycine (betaine obtained from Sigma Aldrich), 21.2 grams of a surfactant mix and balance demineralized water (to 1000 grams) were mixed in a vessel. The pH was regulated to between 9.0 and 9.5 by adding a pH regulator. The mixture was stirred for approximately 60 minutes and filtered over a Pall Profile Star absolute glass filter having a pore size of 1 μm.

For experiments 4-7 the above procedure was repeated with latices NeoCryl® XK237, NeoCryl® A633, NeoCryl® XK205 and NeoCryl® A668 respectively instead of Neocryl® A662.

Note that the ion sensitivity of NeoCryl® XK205 has not been separately determined in the full ionic strength range, but the ion sensitivity is similar to the ion sensitivity of NeoCryl® A633.

The obtained ink composition is shown in Table 2.

TABLE 2

Ink compositions as prepared in experiments 3-6

| amount (wt %) | Exp. 3 | Exp. 4 | Exp. 5 | Exp. 6 | Exp. 7 |
|---|---|---|---|---|---|
| Latex | 9[1] A662 | XK237 | A633 | XK205 | A668 |
| Component | | amount (wt %) | | | |
| Pigment | | 2[1] | | | |
| Glycerol | | 12 | | | |
| Betaine | | 12 | | | |
| pH regulator | | to pH of between 9.0 and 9.5 | | | |
| Surfactant mix | | 2.1 | | | |
| Balance water | | To 100 wt % | | | |

[1]solid content in the total ink composition

Working Example 1

The inks according Experiments 3-7 were rod coated and fused in accordance with the above described methods. The receiving media used were: TC+ gloss and TC+ silk. Robustness tests on the rod-coated receiving media were performed in accordance with the above described method. The results of these tests are shown in Table 3.

Working Example 2

The procedure of Working Example 1 was repeated. The receiving media were first treated with a primer composition as described above, which was applied to the receiving media prior to rod coating the ink compositions thereon. The method of application of the primer composition is not limited to any kind. The primer composition may e.g. be applied by using roller coaters, by ink jet, etc. The primer is coated on the receiving media in a preferred amount of between 0.2 and 2.0 g/m² of the multivalent metal salt. In the present examples the amount of applied primer was such that the amount of $MgCl_2$ was 0.27 g/m², which corresponds to a layer thickness of 1.2 µm of the above described primer composition. The ink layer was applied after applying the primer layer (wet-in-wet). Then the maximum increase of the ionic strength in the total liquid layer (i.e. primer layer and ink layer) was approximately 0.76 when combined with a 10 µm ink layer and 0.49 when combined with a 16 µm ink layer, indicated with numbers 6 and 7, respectively in FIG. 2.

The maximum increase in ionic strength is calculated as follows (example: 1 g/m² $MgCl_2$ and 10 µm ink layer):

0.27 g/m² $MgCl_2$ equals 0.0028 mol/m² $MgCl_2$ (molar mass of $MgCl_2$=95.23 g/mol);

For an ink layer of 10 µm which corresponds to 0.01 l/m² (liter ink per square meter printing substrate), the total liquid layer thickness (i.e. combined with the primer layer of 1.2 µm), the total liquid volume on top of the printing substrate equals 0.0112 l/m²;

The concentration $MgCl_2$ in the total liquid layer equals: 0.0028/0.0112=0.253 mol/l The ionic strength can be calculated in accordance with equation 2:

$$0.5*(0.253*(+2)^2+2*0.253*(-1)^2)=3*0.253=0.76 \text{(see dot in FIG. 2 indicated with 6)}.$$

With an ink layer of 16 µm, a similar calculation results in a maximum ionic strength of 0.49, indicated with dot 7 in FIG. 2.

At these primer conditions, the ionic strength of the wet ink layer increases to a value that is within the interval defined by lower boundary $x_c$ and upper boundary $x_l$ for all exemplified ink compositions (see Table 1).

The robustness results shown in Table 3 show that transport robustness (rub test, see above) in general improves for ink compositions comprising stable dispersed pigment particles and stable dispersed latex resin particles, with increasing difference of the ionic strengths at which the ion sensitivity of both the pigment particles and the latex resin particles are 2 (i.e. with increasing $x_l$-$x_c$ as explained above and shown in Table 1). When combined with primer treatment as described above, the transport robustness (rub test) can be improved by using an ink composition, wherein the difference between $x_c$ and $x_l$ is larger than 2 (see Table 1), preferably larger than 4. In the Examples, said difference is 5.05 for the ink composition according to experiment 7 and >>5.65 for the ink composition according to experiment 5. For ink compositions according to experiments 3 and 4 in combination with primer treatment as described above, the observed transport robustness does not improve or even deteriorates (see experiments 3 and 4 in Table 3). In these ink compositions, the difference between $x_c$ and $x_l$ is smaller than 2 (see Table 1). Without wanting to be bound to any theory it is believed that this is caused by uncontrolled simultaneous destabilization of both the pigment particles and the latex resin particles present in the ink composition upon contact with the polyvalent metal salt ($MgCl_2$) from the primer composition. The robustness in a second fuse step (represented by the nip test performed at 80° C., see above) is attained when using a salt insensitive latex in an ink composition and when combined with primer application.

TABLE 3

Results of robustness tests (Working Examples 1 and 2)

| Medium | Ink thickness (µm) | test | primer | exp. 3 | exp. 4 | Exp. 5 | Exp. 6 | Exp. 7 |
|---|---|---|---|---|---|---|---|---|
| TC + gloss | 10 | rub | no | 1 | 2 | 4 | 3 | 2 |
| | | | yes | 1 | 2 | 4 | 4 | 5 |
| | | nip | no | 5 | 1 | 2 | 2 | 4 |
| | | | yes | 5 | 5 | 4 | 4 | 5 |
| TC + gloss | 16 | rub | no | 1 | 3 | 2 | 2 | n.d.[1] |
| | | | yes | 1 | 2 | 4 | 4 | n.d.[1] |
| | | nip | no | 5 | 1 | 1 | 1 | n.d.[1] |
| | | | yes | 5 | 4 | 5 | 4 | n.d.[1] |
| TC + silk | 10 | rub | no | 1 | 3 | 3 | 4 | 3 |
| | | | yes | 1 | 1 | 5 | 5 | 4 |
| | | nip | no | 5 | 3 | 4 | 4 | 4 |
| | | | yes | 4 | 5 | 5 | 5 | 5 |

[1]not determined

It is noticed in the context of the present examples, that the increase in ionic strength of the total liquid layer that is applied on top of the recording substrate is larger than $x_c$ and that the difference between $x_l$ and the increase in ionic strength is at least 4 for the ink compositions that show improved (transport) robustness after primer application. It can therefore be concluded that latex compositions having a lower ion sensitivity (i.e. larger $x_l$) show a better performance with respect to (transport) robustness.

It is further noticed that the calculations of the increase in ionic strength due to primer application as given above does not take into account drying of the primer and/or ink layers and/or liquid absorption in the printing substrate, which may result in a further increase of the ionic strength in the total liquid layer on top of the surface of the recording substrate. Said further increase of the ionic strength may enhance the destabilization of both the pigment particles and the latex particles.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The invention claimed is:

1. An ink composition, comprising: stable dispersed colorant particles; and stable dispersed latex resin particles, wherein an ion sensitivity of the colorant particles is larger than an ion sensitivity of the latex resin particles, the ion sensitivities of the colorant particles and the latex resin particles being expressed as ionic strengths, $x_c$ and $x_l$, respectively, at which an ion sensitivity ratio of the colorant particles ($IS_c$) being expressed according to equation 1 is 2, and an ion sensitivity ratio of the latex resin particles ($IS_l$) being expressed according to equation 2 is 2, respectively:

$$IS_c = Z_{cav}(x_c \text{MNaCl})/Z_{cav}(H_2O) \qquad \text{equation 1}$$

$$IS_l = Z_{lav}(x_l M NaCl)/Z_{lav}(H_2O) \quad \text{equation 2}$$

wherein: $Z_{cav}$ ($x_c$ M NaCl) is the Z-average particle size determined 200 minutes after adding a droplet of a dispersion comprising colorant particles to 10 ml of a NaCl solution, wherein $x_c$ is the ionic strength (in mol/l) of the NaCl solution to which the droplet of colorant particle dispersion is added and is in a range of 0-6 mol/l; $Z_{cav}$ (H$_2$O) is the Z-average particle size determined 200 minutes after adding a droplet of a dispersion comprising colorant particles to 10 ml of demineralised water, $Z_{lav}$ ($x_l$ M NaCl) is the Z-average particle size determined 200 minutes after adding a droplet of a dispersion comprising latex resin particles to 10 ml of a NaCl solution, wherein is the ionic strength (in mol/l) of the NaCl solution to which the droplet of latex resin particle dispersion is added and is in a range of 0-6 mol/l; $Z_{lav}$ (H$_2$O) is the Z-average particle size determined 200 minutes after adding a droplet of a dispersion comprising latex resin particles to 10 ml of demineralised water, wherein $x_l$-$x_c$ is at least 4 mol/l.

2. The ink composition according to claim 1, wherein the latex resin particles comprise a resin selected from the group consisting of polyester resins, polyurethane resins, polyepoxy resins, polyamide resins, polyether resins, poly(meth) acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymer resins.

3. The ink composition according to claim 1, further comprising a cosolvent.

4. The ink composition according to claim 1, further comprising a surfactant.

5. The ink composition according to claim 4, further comprising an additive.

6. An ink set, comprising:
   an ink composition according to claim 1; and
   a reaction liquid comprising a precipitating agent, the precipitating agent being capable of selectively destabilizing the colorant particles.

7. The ink set according to claim 6, wherein the precipitating agent comprises a polyvalent metal salt.

8. The ink set according to claim 7, wherein the polyvalent metal salt comprises a metal ion selected from the group consisting of $Ca^{2+}$, $Cu^{2+}$, $Ni^{2+}$, $Mg^{2+}$, $Zn^{2+}$, $Ba^{2+}$, $Al^{3+}$, $Fe^{3+}$, $Cr^{3+}$, $Y^{3+}$ and $Zr^{4+}$.

9. The ink set according to claim 8, wherein the polyvalent metal salt comprises an anion selected from the group consisting of carbonate, sulfate, nitrate, chloride, borate and phosphate.

10. A method of printing comprising the steps of:
    applying a reaction liquid comprising a polyvalent metal salt to a recording substrate as a first liquid layer; and
    printing an image with an ink composition according to claim 1 on the recording substrate as a second liquid layer,
    wherein an amount of polyvalent metal salt in the reaction liquid is such that the ionic strength in the total liquid layer comprised of the first liquid layer and the second liquid layer is in the range of between $x_c$ and $x_l$.

11. The method according to claim 10, wherein the reaction liquid is first applied and subsequently the image is printed.

12. The method according to claim 11, wherein the first liquid layer is first dried and wherein the amount of polyvalent metal salt in the reaction liquid is such that the polyvalent metal salt increases the ionic strength of the second liquid layer to a value in the range of between $x_c$ and $x_l$.

13. The ink composition according to claim 2, wherein the latex resin particles comprise copolymers resins selected from the group consisting of styrene-acrylate copolymer resins and styrene-butadiene copolymer resins.

14. The ink composition according to claim 3, wherein the cosolvent is selected from the group consisting of polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

15. The ink composition according to claim 4, wherein the surfactant is selected from the group consisting of hydrocarbon surfactants, fluoro surfactants and silicon surfactants.

16. The ink composition according to claim 5, said additive being one or more selected from the group consisting of a dispersion stabilizing cosolvent, a penetrant, a viscosity modifier, a pH modifier.

17. The ink composition according to claim 1, wherein when $IS_c$ and $IS_l$ are both equal to 2, $x_l$-$x_c$ is at least 5 mol/l.

* * * * *